United States Patent [19]

Morris et al.

[11] 4,336,367

[45] Jun. 22, 1982

[54] EPOXY ADHESIVE COMPOSITION

[75] Inventors: David R. Morris, Beltsville; Porter W. Erickson, Silver Spring, both of Md.

[73] Assignee: The United States of America as represented by the Secretary of the Navy, Washington, D.C.

[21] Appl. No.: 827,475

[22] Filed: May 15, 1969

[51] Int. Cl.³ .............................................. C08L 63/00
[52] U.S. Cl. .................................... 524/770; 528/394; 528/361; 524/361
[58] Field of Search ...... 260/3 EP, 30.4 EP, 32.8 EP; 528/361, 394

[56] References Cited

U.S. PATENT DOCUMENTS 3,378,504  4/1968  Lee, Jr. .............................. 260/2 EP

Primary Examiner—Leland A. Sebastian

[57] ABSTRACT

An adhesive epoxy resin composition particularly useful in underwater environments which is the result of the admixture of a 3,4-epoxycyclohexylalkyl 3,4-epoxycyclohexanecarboxylate, exo-exo bis(2,3-epoxycyclopentyl) ether, endo-exo bis(2,3-epoxycyclopentyl) ether, a trialkoxyboroxine curing agent and a surfactant and methods of making said adhesive.

11 Claims, No Drawings

EPOXY ADHESIVE COMPOSITION

BACKGROUND OF THE INVENTION

This invention relates generally to adhesive compositions and more particularly to an epoxy resin adhesive composition and methods of preparation.

In the past, attempts to employ adhesive compositions in underwater environments have met with little success. This unsuccess has been mainly the result of at least two factors, (1) the inability of the prior art compositions to cure, i.e. set up or harden, in very short periods of time, and (2) the necessity of outside sources of heat for the curing process to occur. It can be appreciated by one skilled in the art how each of these deficiencies may greatly impair the efficiency of an underwater operation, such as, e.g. clandestinely attaching an ordnance device to the bottom of a ship. On the other hand the many advantages of employing an adhesive composition in such an underwater operation as opposed to the present magnetic attachment methods which among other things are noisy and prevent the use of compasses can also be greatly appreciated.

SUMMARY OF THE INVENTION

It is therefore an object of the present invention to provide a new epoxy resin adhesive compromision.

Another object of the present invention is to provide an adhesive composition particularly adaptable for use in an underwater environment.

A further object of this invention is to provide an epoxy resin adhesive composition which cures extremely quickly and without the aid of outside sources of heat.

These and other objects are accomplished by providing a composition of matter comprising the resin which is the reaction product of the admixture a 3,4-epoxycyclohexylalkyl 3,4-epoxycyclohexanecarboxylate, exo-exo bis(2,3-epoxycyclopentyl) ether, endo-exo bis(2,3-epoxycyclopentyl) ether a trialkoxyboroxine curing agent and a surfactant when the adhesive is utilized in an underwater environment.

DESCRIPTION OF THE PREFERRED EMBODIMENTS

In accordance with this invention, the 3,4-epoxycyclohexylalkyl 3,4-epoxycyclohexanecarboxylates which may be employed are represented structurally by formula I given below.

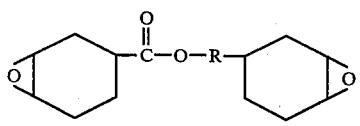

FORMULA I wherein R can be methylene, ethylene, and propylene. All of these materials are either preparable by well known processes or commercially available. While any of the compounds falling within the scope of formula I may be employed the preferred carboxylate which is used for optimum results is 3,4-epoxycyclohexylmethyl 3,4-epoxycyclohexanecarboxylate and is commercially available from The Union Carbide Corporation as ERLA 4221.

The trialkoxyboroxine curing agents which are employed in the adhesive compositions of the present invention are also commercially available and fall within the scope of those compounds represented by the general structural formula II given below.

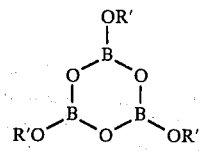

FORMULA II wherein R' is an alkyl group having 1 to 4 carbons. The preferred trialkoxyboroxine which is used is trimethoxyboroxine i.e. where R' in Formula II is methyl.

Exo-exo bis(2,3-epoxycyclopentyl) ether and endo-exo bis(2,3-epoxycyclopentyl) ether are further jointly employed in the compositions of the present invention and are represented by formulas III and IV, respectively.

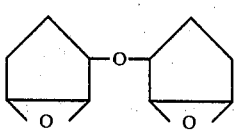 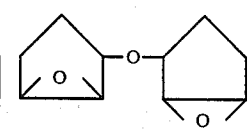

FORMULA III     FORMULA IV

The compound represented by the structural formula III is commercially available from the Union Carbide Corporation as ERLA 0400, while the compound represented by the structural formula IV is commercially available from The Union Carbide Corporation as ERLA 0300.

To enable the adhesive composition of the present invention to be more compatible to surfaces underwater a surfactant, such as AquaBlok, a heterocyclic liquid product of Tracor Inc. Austin, Texas is added. Other surfactants such as 2,6-dimethyl-4-heptanone and the like may also be employed.

The amounts i.e. ratios of the materials hereinbefore which may be described combined to provide the adhesive compositions of the present invention may vary within operational limits and are easily determinable by one skilled in the art.

Preferably, the adhesive composition of the present invention is prepared by the admixture of a 2:3 ratio of a compound within the scope of Formula I and a 1:1 mixture of the materials represented by Formulas III and IV. In addition, for every five parts (5) of this total mixture, one and one-half ($1\frac{1}{2}$) parts of trialkoxyboroxine (see Formula II) curing agent is added. When a surfactant, such as AquaBlok, is desired in underwater applications, only a very small amount is required for optimum results such as about $\frac{1}{2}$ percent (by weight).

Although the order of mixing the materials of the present invention is not critical, it is not advantageous to add the trialkoxyboroxine curing agent to the carboxylate material before the addition of the ether compounds, since the carboxylate and curing agent react almost instantly. Preferably the trialkoxyboroxine curing agent is added to a pre-mixture which comprises the 3,4-epoxycyclohexylalkyl 3,4-epoxycyclohexanecarboxylate, the exo-exo bis (2,3-epoxycyclopentyl) ether, the endo-exo bis(2,3-epoxycyclopentyl) ether and also the surfactant, if desired.

The general nature of the invention having been set forth, the following example is presented as a specific illustration thereof. It will be understood that the invention is not limited to this example but is susceptible to various modifications that will be recognized by one of ordinary skill in the art.

EXAMPLE 1

Three grams of ERLA 0400 were mixed with two grams of ERLA 4221. This mixture was then put in a water-tight container and 1/20 of a milliliter of Aqua-Blok was added and mixed. 1.5 grams of trimethoxyboroxine curing agent was added to this mixture. This adhesive composition was then extruded onto a metal surface which was underwater and another metal material was bonded thereto.

The adhesive sets up in approximately 30 seconds and a bond strengths of over 100 psi was developed within 5 minutes.

Similar compositions are made employing the other hereinbefore identified materials.

Obviously, numerous modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. An adhesive composition of matter comprising the resin obtained by the admixture of a 3,4-epoxycyclohexylalkyl 3,4-epoxycyclohexanecarboxylate, exo-exo bis(2,3-epoxycyclopentyl) ether, endo-exo bis(2,3-epoxycyclopentyl) ether and a trialkoxyboroxine.

2. The composition of matter as defined in claim 1 wherein said 3,4-epoxycyclohexylalkyl 3,4-epoxycyclohexanecarboxylate is 3,4-epoxycyclohexylmethyl 3,4-epoxycyclohexanecarboxylate and said trialkoxyboroxine is trimethoxyboroxine.

3. The composition of matter as defined in claim 1 wherein the ratio of said carboxylate to a 1:1 mixture of said exo-exo bis(2,3-epoxycyclopentyl) ether and endo-exo bis(2,3-epoxycyclopentyl) ether is 2:3 and said trialkoxyboroxine is added in a ratio of 1.5 to every 5 parts of the mixture of said carboxylate and ethers.

4. An adhesive composition of matter comprising the resin obtained by the admixture of a 3,4-epoxycyclohexylalkyl 3,4-epoxycyclohexanecarboxylate, exo-exo bis(2,3-epoxycyclopentyl) ether, endo-exo bis(2,3-epoxycyclopentyl) ether, a trialkoxyboroxine and a surfactant.

5. The composition of matter as defined in claim 4 wherein said 3,4-epoxycyclohexylalkyl 3,4-epoxycyclohexanecarboxylate is 3,4-epoxycyclohexylmethyl 3,4-epoxycyclohexanecarboxylate, said trialkoxyboroxine is trimethoxyboroxine and said surfactant is 2,6-dimethyl-4-heptanone.

6. The composition of matter as defined in claim 4 wherein the ratio of said carboxylate to a 1:1 mixture of said exo-exo bis(2,3-epoxycyclopentyl) ether and endo-exo bis (2,3-epoxycyclopentyl) ether is 2:3, said trialkoxyboroxine is added in a ratio of 1.5 to every 5 parts of the mixture of said carboxylate and ethers and said surfactant is added in a quantity which is about ½ percent by weight of the total mixture.

7. The composition comprising a 3,4-epoxycyclohexylalkyl 3,4-epoxycyclohexanecarboxylate, exo-exo bis(2,3-epoxycyclopentyl) ether and endo-exo bis(2,3-epoxycyclopentyl) ether.

8. The composition as defined in claim 7 which further includes a surfactant.

9. The composition as defined in claim 7 wherein said 3,4-epoxycyclohexylalkyl 3,4-epoxycyclohexanecarboxylate is 3,4-epoxycyclohexylmethyl 3,4-epoxycyclohexanecarboxylate.

10. The composition as defined in claim 8 wherein said surfactant is 2,6-dimethyl-4-heptanone.

11. The composition as defined in claim 7 wherein the ratio of said carboxylate to a 1:1 mixture of said exo-exo bis(2,3-epoxycyclopentyl) ether is 2:3.

* * * * *